MARC REICHENBACH AND SAMUEL GOLAY, OF PARIS, FRANCE.

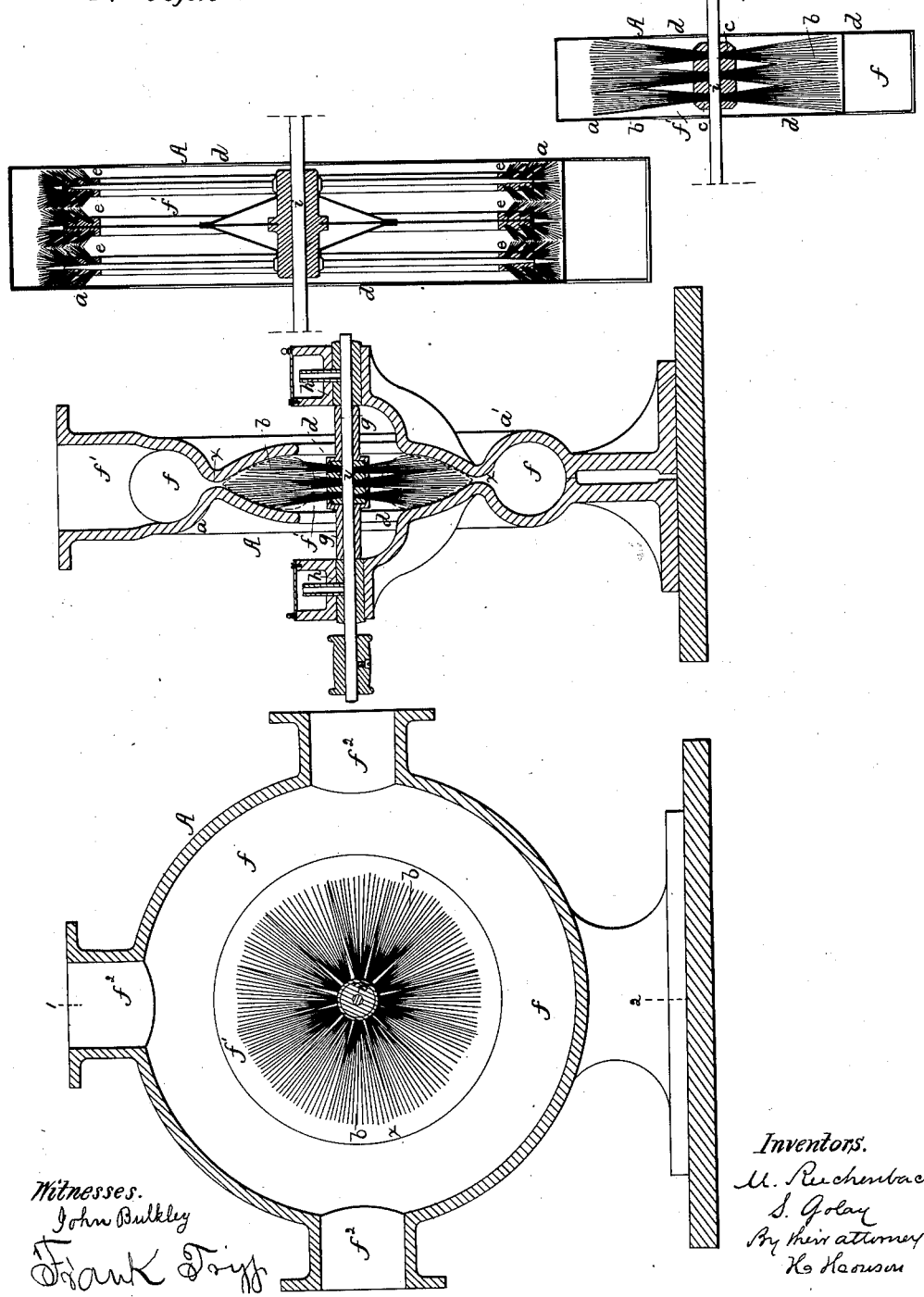

*Letters Patent No. 86,320, dated January 26, 1869.*

IMPROVEMENT IN BLOWING-MACHINES.

The Schedule referred to in these Letters Patent and making part of the same.

*To all whom it may concern:*

Be it known that we, MARC REICHENBACH and SAMUEL GOLAY, of Paris, France, have invented an Improved Blowing-Apparatus; and we do hereby declare the following to be a full, clear, and exact description of the same.

Our improvement consists, first, of an annular chamber in the casing of a blowing-apparatus, for the accumulation of the air driven from the centre of the apparatus.

Our improvement further consists in the substitution, for the wings ordinarily employed, of a circular brush, of bristles, whalebone, or wire, by the use of which the disagreeable noise occasioned by ordinary blowers is prevented.

In order to enable others skilled in the art to make and use our invention, we will now proceed to describe its construction and operation, reference being had to the accompanying drawings, which form a part of this specification, and in which—

Figure 1, Sheet No. 1, is a vertical section of our improved blowing-apparatus;

Figure 2, a sectional elevation on the line 1–2, fig. 1; and

Figures 3 and 4, Sheet No. 2, are modifications of our invention.

The casing A of the apparatus consists of two sections, $a$ and $a'$, which are connected by screw-bolts, the sections being so formed that, when together, they enclose the circular fan-chamber $f^1$, and the annular air-chamber $f$, which communicates with the fan-chamber through a narrow passage, $x$.

Air is admitted to the fan-chamber through openings $d$, on each side of the casing, and with the air-receptacle $f$ communicate radial tubes $f^2$, for the exit of the air; these tubes either communicating with separate pipes or with a single curved pipe, so as to direct the whole current of air to one point.

To a central spindle, $i$, turning in bearings in brackets projecting from the sections $a\ a'$, is secured the nave of a circular brush, $b$, the latter consisting of bristles, wire, or other suitable material.

Care must be taken to sufficiently separate, at their bases, the bunches of bristles or other material which forms the brush, that the air may pass to the centre of the apparatus, from which it is driven by the rotation of the brush through the passage $x$, and into the chamber $f$.

Owing to the flexibility of the fibres of the brush, they will be maintained in contact, or nearly in contact, with the walls of the chamber, so that the roaring noise produced by the counter-currents of air which are formed between the walls of the chamber and the vanes of a fan, when the latter is used, is prevented.

Inasmuch as the opposite sides of the chamber $f^1$ are concave, instead of flat, as in ordinary blowers, the passage of air from the same is greatly facilitated, and the formation of eddies is prevented.

In fig. 4, the brush is represented as applied to an apparatus in which the spindle is eccentric to the casing, the air being driven toward the circumference of the latter, and through an exit-pipe, in the same manner as in blowers in which vanes are used.

In ventilators of a large size, the brushes may be secured to the rims of wheels attached to the shaft $i$, as shown in fig. 3.

We claim as our invention, and desire to secure by Letters Patent—

1. A blowing-apparatus, consisting of a casing, with openings arranged for the passage of air, and within which revolves a fan, consisting of flexible filaments, substantially as described.

2. The casing, with its chambers $f\ f^1$, passage $x$, inlet and exit-passages, and revolving fan or brush $b'$, the whole being constructed and arranged substantially as and for the purpose specified.

In testimony whereof, we have signed our names to this specification, in the presence of two subscribing witnesses.

M. REICHENBACH.
SL. GOLAY.

Witnesses:
   E. RICHARD,
   A. COINY.